(12) United States Patent
Helm

(10) Patent No.: US 12,290,856 B2
(45) Date of Patent: May 6, 2025

(54) METHOD FOR ADDITIVELY MANUFACTURING THREE-DIMENSIONAL COMPONENTS AND CORRESPONDING DEVICE

(71) Applicant: AM Metals GmbH, Halsbruecke (DE)

(72) Inventor: Axel Helm, Dresden (DE)

(73) Assignee: AM Metals GmbH, Halsbruecke (DE)

( * ) Notice: Subject to any disclaimer, the term of this patent is extended or adjusted under 35 U.S.C. 154(b) by 784 days.

(21) Appl. No.: 17/594,883

(22) PCT Filed: May 22, 2020

(86) PCT No.: PCT/EP2020/064263
§ 371 (c)(1),
(2) Date: Nov. 2, 2021

(87) PCT Pub. No.: WO2020/234446
PCT Pub. Date: Nov. 26, 2020

(65) Prior Publication Data
US 2022/0305561 A1    Sep. 29, 2022

(30) Foreign Application Priority Data
May 23, 2019 (DE) .......................... 102019113841.8

(51) Int. Cl.
*B22F 10/36* (2021.01)
*B22F 10/28* (2021.01)
(Continued)

(52) U.S. Cl.
CPC .............. *B22F 10/28* (2021.01); *B22F 10/36* (2021.01); *B22F 10/366* (2021.01); *B22F 12/46* (2021.01);
(Continued)

(58) Field of Classification Search
CPC ... B29C 64/153; B29C 64/268; B29C 64/277; B29C 64/393; B29C 64/40; B23K 9/042;
(Continued)

(56) References Cited

U.S. PATENT DOCUMENTS

2017/0157839 A1   6/2017  Knoll et al.
2017/0341145 A1   11/2017 Foster et al.
(Continued)

FOREIGN PATENT DOCUMENTS

DE    102012202487    8/2013
EP    1583628         11/2010
(Continued)

OTHER PUBLICATIONS

PCT Search Report for Application No. PCT/EP2020/064263, dated Aug. 31, 2020, 160 pages.
(Continued)

*Primary Examiner* — Hung D Nguyen
(74) *Attorney, Agent, or Firm* — Polsinelli PC

(57) ABSTRACT

The invention relates to a method for additively manufacturing, wherein an irradiation path of the impinging beam deviates during the feed from a, in particular straight, feed centre line M, wherein at least one line P parallel to M or corresponding to M is successively crossed by the irradiation path at three points P1, P2 and P3, so that applies: P2 lies further forward in the feed direction than P1 and P3 lies between P1 and P2, at a distance p1 from P1 and a distance p2 from P2, where: $p2/p1 \geq 2.0$, preferably $p2/p1 \geq 3.5$.

16 Claims, 5 Drawing Sheets

(51) Int. Cl.
| | |
|---|---|
| *B22F 10/366* | (2021.01) |
| *B22F 12/46* | (2021.01) |
| *B22F 12/49* | (2021.01) |
| *B23K 9/04* | (2006.01) |
| *B23K 26/082* | (2014.01) |
| *B33Y 10/00* | (2015.01) |
| *B33Y 30/00* | (2015.01) |
| *B22F 10/85* | (2021.01) |
| *B33Y 50/02* | (2015.01) |

(52) U.S. Cl.
CPC .............. *B22F 12/49* (2021.01); *B23K 9/042* (2013.01); *B23K 26/082* (2015.10); *B33Y 10/00* (2014.12); *B33Y 30/00* (2014.12); *B22F 10/85* (2021.01); *B33Y 50/02* (2014.12)

(58) Field of Classification Search
CPC .............. B23K 26/0608; B23K 26/064; B23K 26/073; B23K 26/0732; B23K 26/0738; B23K 26/082; B23K 26/342; B33Y 10/00; B33Y 30/00; B33Y 50/00; B33Y 50/02; B22F 12/41; B22F 12/44; B22F 12/45; B22F 12/46; B22F 12/49; B22F 12/55; B22F 10/21; B22F 10/28; B22F 10/31; B22F 10/36; B22F 10/362; B22F 10/364; B22F 10/366; B22F 10/385; B22F 10/80; B22F 10/85; Y02P 10/25
See application file for complete search history.

(56) References Cited

U.S. PATENT DOCUMENTS

| | | |
|---|---|---|
| 2018/0021887 A1 | 1/2018 | Liu et al. |
| 2018/0200959 A1* | 7/2018 | Medeiros Araujo ........................ B29C 64/153 |
| 2019/0054567 A1* | 2/2019 | Roerig ................... B33Y 10/00 |
| 2020/0223139 A1* | 7/2020 | Hunze ................... B29C 64/277 |

FOREIGN PATENT DOCUMENTS

| | | |
|---|---|---|
| EP | 2893994 | 7/2015 |
| EP | 3196001 | 7/2017 |
| WO | 2017137391 | 8/2017 |

OTHER PUBLICATIONS

German Search Report for Application No. 102019113841.8, dated Jan. 13, 2020, 94 pages.
PCT Written Opinion for Application No. PCT/EP2020/064263, dated Dec. 2, 2021, 10 pages.

\* cited by examiner

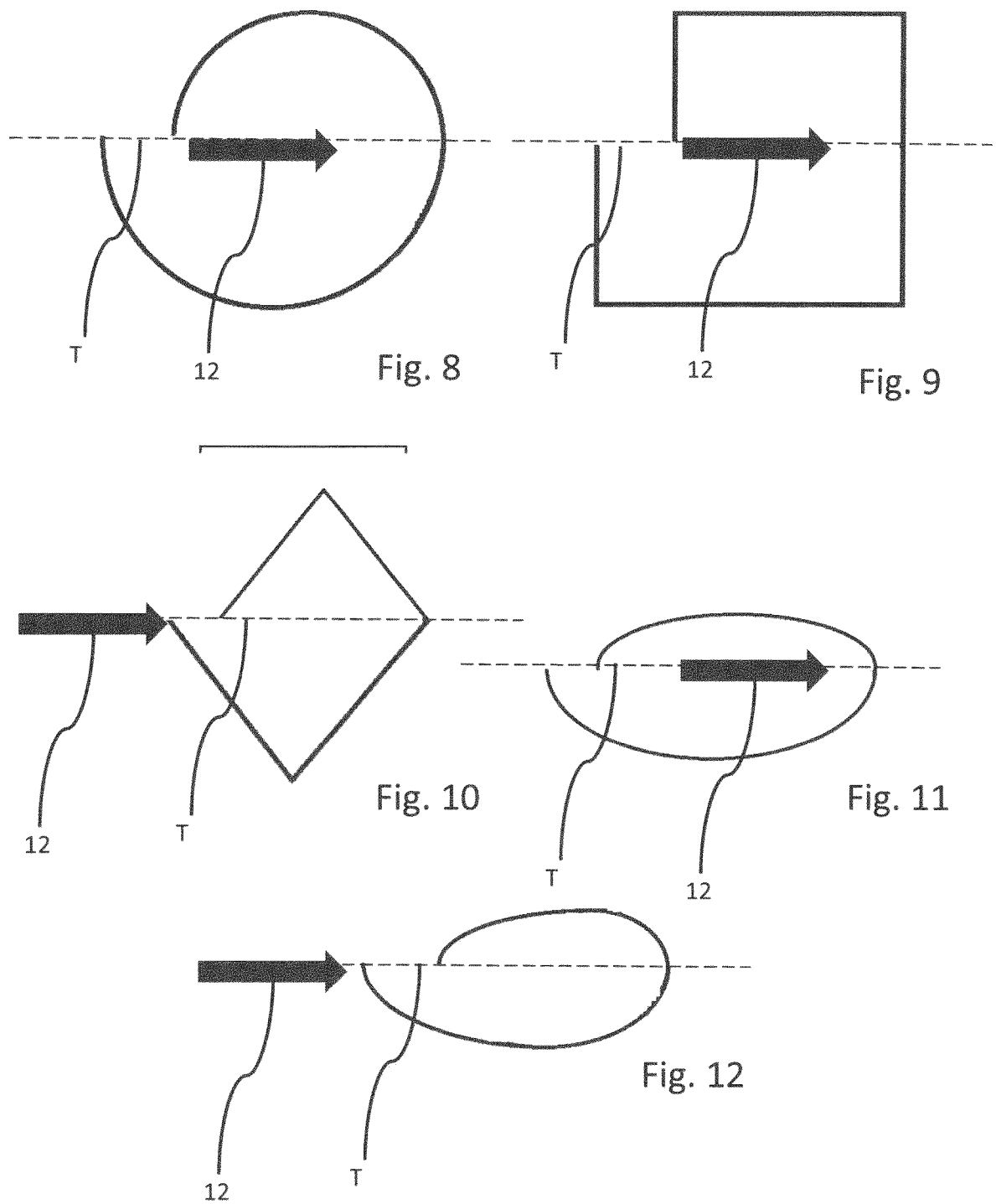

METHOD FOR ADDITIVELY MANUFACTURING THREE-DIMENSIONAL COMPONENTS AND CORRESPONDING DEVICE

DESCRIPTION TECHNICAL FIELD OF THE INVENTION

The invention relates to a method for additively manufacturing three-dimensional components by layer-by-layer application of a build-up material and locally selective solidification of the build-up material. The invention further relates to a manufacturing device for additively manufacturing three-dimensional components and a corresponding irradiation unit for such a manufacturing device.

BACKGROUND OF THE INVENTION

Methods and corresponding devices for additively manufacturing three-dimensional components by layer-by-layer application and locally selective solidification of a build-up material are known in principle from the prior art. For layer-by-layer application, at least one corresponding coating unit is usually provided. For local selective solidification, at least one corresponding irradiation unit (e.g. comprising at least one laser) is usually provided.

Typically, the point of impact of a beam for local selective solidification is moved along linear paths (possibly in alternating directions). This leads to a punctual melting of the build-up material (powder) and subsequent solidification, which in turn can lead to a stressed result.

Furthermore, it is known from the prior art, in particular EP 2 893 994 A1, EP 1 583 628 B1 and DE 10 2012 202 487 A1, to move the point of impact of the beam along a non-linear path. This is achieved, for example, in EP 2 839 994 A1 in that for a linear advance of the irradiation curve (irradiation path) a term is superimposed perpendicular to this linear advance, so that in particular sinusoidal irradiation curves are obtained.

In EP 1 583 628 B1, an interference term is superimposed on a linear forward direction so that, according to the embodiment, a helix-like course of the irradiation path is achieved and thus the impinging beam is also partially moved against the feed direction (viewed locally). From DE 10 2012 202 487 A1 (according to one embodiment) also a helix-like course, here in the form of a cycloid is described.

US 2017/0341145 A1 describes a so-called "stirring" in additive manufacturing processes using a laser. FIG. 2 shows paths that are somewhat inaccurately described as "circular" or "elliptical". However, the so-called "elliptical" path is not a true elliptical path or does not form an ellipse, but is composed of round and relatively long sections. Particularly in the embodiment with comparatively long straight sections, a comparatively localised heat input in the area of the straight sections (which are passed over in sections several times) is to be expected.

Compared to the prior art, the reduction of, in particular stress-induced, irregularities is considered to be in need of further improvement.

SUMMARY OF THE INVENTION

It is an object of the invention to propose a method for additively manufacturing three-dimensional components as well as a corresponding manufacturing device and a corresponding irradiation unit, in which, in particular stress-induced, irregularities can be further reduced. In particular, the shortest possible building time should also be realised.

In particular, the object (according to a first aspect of the invention) is solved by a method for additively manufacturing three-dimensional components by layer-by-layer application of a build-up material and locally selective solidification of the build-up material by at least one beam (following a feed direction, with deviations with respect thereto) impinging on the build-up material, wherein an irradiation path of the impinging beam (i.e. in particular a path of an impingement point or impingement area of the beam) deviates during the feed from a, in particular straight, feed centre line M, wherein at least one line parallel to M or corresponding to M is successively crossed by the irradiation path at three points P1, P2 and P3 (in the said chronological order: first P1, then P2, then P3), so that applies:

P2 lies further ahead in the feed direction than P1 and

P3 lies between P1 and P2, at a distance p1 from P1 and a distance p2 from P2, where: $p2/p1 \geq 2.0$; preferably $p2/p1 \geq 2.5$; more preferably $p2/p1 \geq 3.0$; more preferably $p2/p1 \geq 3.5$; more preferably $p2/p1 \geq 4.0$ or even $p2/p1 \geq 5.0$.

Preferably applies: $p2/p1 > 3.0$; further preferably $p2/p1 \geq 3.1$; further preferably $p2/p1 \geq 3.5$; further preferably $p2/p1 \geq 3.6$. Alternatively or additionally, it preferably applies that at least one maximum of a deviation from M, in particular in a section (containing the maximum) of the irradiation path between P1 and P2, is a point-shaped maximum and/or at least one such maximum is a (straight) line-shaped maximum with a length l (or co-forms such a linear maximum), for which applies: $l < 0.33$; preferably $l \leq 0.32$, further preferably $l \leq 0.30*(p1+p2)$, further preferably $l \leq 0.20*(p1+p2)$, or $l \leq 0.10*(p1+p2)$ and/or at least one such maximum is a (straight) line-shaped maximum with a length l (or co-forms such a line-shaped maximum) for which applies: $l \leq 0.375*p2$; preferably $l \leq 0.325*p2$, further preferably $l \leq 0.200*p2$, or $l \leq 0.150*p2$. Particularly preferably, at least one of the aforementioned conditions applies to several, e.g. at least 50% of all, or at least 75% of all, or all such maxima (each related to an associated section between P1 and P2). By a point-shaped maximum is to be understood in particular a maximum that does not lie within the ends of any straight section (and also does not form any of the ends). By a line-shaped maximum is to be understood in particular a maximum that forms a straight section or consists of such a section. The respective length l should then in particular be the length between the two ends of the straight section (whereby the ends in turn are defined by the path deviating from the straight course or the straight course ends). In particular, a (sub)section in this sense (with at least one end at which the path does not deviate from the straight course or the straight course does not end) shall not be decisive for the determination of the line-shaped maximum or the length l.

Due to an (at least in sections, in particular in the area of a maximum of the deviation from M) uneven (or at least forming only a comparatively short straight section) course of the irradiation path, the heat input can furthermore (in particular in a direction transverse to the feed direction) be done more uniform. In particular, the long straight sections as they are shown in US 2017/0341145 A1 in FIG. 2B and the therewith associated (in the transverse direction) comparatively localised heat input are avoided. As a result, undesirable stresses can be reduced.

Preferably, the maximum of a deviation from M, in particular in a section (containing the maximum) of the irradiation path between P1 and P2 is a component of a curved section. This is to be understood in particular that the respective point under consideration is not a component of a straight line. The curvature can be continuous (as for example with a circular arc or a section of an ellipse). However, discontinuous shapes (as for example the vertex of a triangle) are also conceivable. In this respect, the curvature can also go to infinity (but it should preferably not be zero, i.e. exist at all).

A radius of curvature (in the area of the respective maximum) is preferably ≤10 mm, further preferably ≤1 mm, possibly ≤800 μm or ≤500 μm.

In embodiments, the irradiation path does not have straight sections that are parallel to M. Optionally, the irradiation path has no straight sections at all.

If the irradiation path has straight sections, these (in total) preferably form less than 80%, further preferably less than 50%, optionally less than 25% or less than 10% of the irradiation path (or of its length, in particular in an imaginary, straight drawn state of the irradiation path) and/or more than 2% of the irradiation path (or of its length, in particular in an imaginary, straight drawn state of the irradiation path).

If the irradiation path has straight sections, at least one (possibly several or all) of these is (are) preferably shorter than, in particular at most 0.5 times or at most 0.25 times as large as, the width of the solidification path explained in more detail below or as a distance between the envelopes explained in more detail below (in particular if these run parallel to one another and straight).

If the irradiation path has straight sections, at least one (possibly several or all) of these is (are) preferably shorter than 1 mm, possibly shorter than 250 μm or shorter than 100 μm or even shorter than 50 μm.

Advantageously, comparatively large surface areas are created in which heating of the build-up material (powder) and corresponding cooling takes place comparatively slowly. This is achieved in particular in that the impinging beam is moved back in phases comparatively far against the feed direction. By this stresses can be reduced. Furthermore, in particular a comparatively short building time can be achieved. Preferably, the processing of comparatively demanding materials, such as Cu, is possible. A stress reduction in the material (build-up material) is achieved in particular by heating and melting the build-up material (powder) comparatively slowly and then also cooling it slowly. During the initial cooling, a new heat input takes place when passing over the same irradiation area. Comparatively demanding materials such as copper (Cu) are easier to process, since in particular porosities (irregularities) in the solidified material can be at least partially healed by an extended (sustained) application of the irradiation.

According to a second aspect of the invention, the above object is solved in particular by a method for additively manufacturing three-dimensional components, in particular according to the first aspect, by layer-by-layer application of a build-up material and locally selective solidification of the build-up material by at least one beam impinging on the build-up material (following a feed direction, with deviations with respect thereto), wherein an irradiation path (i.e. in particular a path of an impingement point or impingement region of the beam) of the impinging beam deviates during the feed from a, in particular straight, feed centre line M, wherein a deviation from M passes through at least two at least local maxima s1 and s2, where (or for which) the following according to absolute value applies: s1≠s2. Preferably, at least one line parallel to M or corresponding to M is crossed successively by the irradiation path at three points P1, P2 and P3 (in the mentioned temporal order: first P1, then P2, then P3), where applies: P2 lies further forward in the feed direction than P1. This condition preferably applies (at least) in a region between s1/2 and s2/2. According to the second aspect, a comparatively uniform irradiation of the build-up material can be achieved, by which in turn stresses and corresponding irregularities can be reduced.

By a feed is generally to be understood an advance or propagation of a solidification path (resulting from the irradiation) in a certain direction.

By a feed direction (or main direction of propagation) is to be understood in particular a direction of propagation of a solidification path. The feed direction is preferably (over at least one row or column during the entire irradiation for producing the object) constant, but can also vary (for example, if the solidification path is not a linear path, but a curved, i.e. non-linear path).

The irradiation path per se deviates from this feed direction according to the invention (at least in sections), but follows it in the sense that (viewed over a certain row or column of the irradiation) the impinging beam propagates in this direction.

Under the feed centre line M is to be understood in particular that line which runs centrally within the solidification path. If the advance of the solidification path is straight (for example, in the case of irradiation in rows/columns), the feed centre line is also straight. Alternatively or additionally, the feed centre line M can also be determined in that for all upper maxima an (in embodiments straight) envelope E1 (or enveloping curve, analogous to a beat for the superposition of two oscillations) is formed and for all lower maxima an (in embodiments straight) envelope E2 is formed and the feed centre line M is placed exactly between these envelopes. In this context, the upper envelope is to be understood only as a demarcation from the lower envelope, in the sense that the envelopes lie on different sides of the centre line. The envelope(s) can each run straight.

The solidification path is in particular that area which is tempered by the irradiation (of the irradiation unit, in particular of a laser) to such an extent that the build-up material melts (and after cooling solidifies). This solidification path is (at least approximately) defined by the area lying between the envelopes E1, E2 and (additionally) by a beam width or width of a thermal effective area (respectively half such a width in the area of both envelopes) of the impinging beam.

Under a thermal effective area it is to be understood in particular the area about the irradiation path (assumed as a line) in which such an energy input is introduced by the beam (laser) that the build-up material heats up. This width can be assumed to be, for example, 2.5*d86.

As far as it depends on the beam diameter d, the d86 diameter should preferably be used, where d86 in turn means the diameter within which 86% of the radiation power (of the beam, in particular the laser beam) is introduced. In particular, a diameter d86 of 80 μm means that 86% of the (laser) power impinges in an area with a diameter of 80 μm. The (laser) power may be distributed according to the Gaussian distribution. Other distributions are possible. With a d86 of 80 μm, the impinging laser beam preferably leads to heating in an effective area with a diameter of (approx.) 200 μm (around the respective centre of the irradiation path). The heating of the heated area can (depending on the point in time) form a preheating or sintering or (at a later point in time) a melt pool, which is generated the radiation source (in particular by the laser).

The path referred to as irradiation path should preferably correspond to a control information with which the irradiation unit is controlled. The actually executed path of the beam may deviate from this, since e.g. the inertia of the deflection unit may lead to a deviation from the theoretical path of the beam.

A temperature profile within the solidification path can be controlled, for example, by the power of the irradiation source, the focus width of the beam and/or the speed at which the beam travels. These parameters can, for example, be empirically adapted to the properties of the build-up material and the object to be produced.

For the determination of an enveloping curve (envelope) preferably (local) maxima that lie completely within at least one other path section are not taken into account. The enveloping curve should therefore preferably not intersect the irradiation path at any point, but only tangent to it.

In particular, it is to be distinguished between the irradiation path, i.e. the path which the impinging beam actually follows, and the solidification path, which preferably has a width that is greater than the width of the impinging beam. Insofar as it depends on the position of the impinging beam (for example, for determining the irradiation path), in particular the centre point (geometric focus in the area) of the impinging area (at a certain point in time) is to be understood.

Solidification paths or areas lying next to each other (for example in successive rows or columns), which are each delimited by two corresponding envelopes, may overlap (for example over at least 5% and/or at most 50% of a width of at least one corresponding area or at least one solidification path) or not overlap (or be spaced apart from each other) or abut each other.

At three points P1, P2 and P3 the irradiation path is preferably crossed successively. Before and after the (respective) crossing, the irradiation path thus lies in particular on different sides of the feed centre line M. If the crossing does not take place at a specific point, but over a certain section (e.g. flat point, in the mathematical sense), it applies in particular that the respective point (or place of crossing) is the centre point of the then straight running section.

According to the first aspect, P2 is further forward in the feed direction than P1. In particular, this means that with respect to the feed direction, a section containing the point P2 is crossed later than a section containing the point P1. In relation to the feed direction (main direction of propagation), P1 in particular is therefore closer to a start of the respective solidification path than P2 or P1 is crossed first (before P2 is crossed).

Insofar as the distances p1 and p2 are to be compared, the respective absolute values (in the mathematical sense) are preferably to be taken into account (unless otherwise stated).

The (local) maxima s1 and s2 can be located on the same side of M. Alternatively or additionally, the local maxima s1 and s2 or further local maxima s1' and s2' may be located on different sides of M (with respect to each other).

In embodiments, it may apply that s1, s1', s2 and s2' are (in the order mentioned) consecutive maxima, where s1 and s2 are on the same side of M and s1' and s2' are both on the other side of M, where s1>s2 and/or s1>s2'; and/or s1'>s2' and/or s1'>s2; and/or s1=s1' and/or s2=s2'. This pattern may repeat cyclically (e.g. at least 10 times).

On both sides of M there are at least 10, preferably at least 100, possibly at least 1,000 (local) maxima. In principle, under a (local) maximum is to be understood a point at which the irradiation path approaches the centre line M again after moving away from it, or is the part of a group of points that together form a linear (local) maximum (e.g. in the case of flattenings or rectangular shapes). For the envelope (see above), however, preferably not all of these local maxima are taken into account, but only the outer, local maxima (which may possibly also be global maxima). Under a global maximum a maximum whose distance to M is not exceeded by any other (local) maximum is to be understood.

Preferably, a dividing line is defined which separates the first and second irradiation path sections from each other. Preferably, several, in particular the plurality of, preferably all reversal point(s) of the irradiation path lie on the dividing line. In embodiments, a shape of the second irradiation path sections may preferably correspond to a shape of the first irradiation path sections (e.g. both structures may be defined by circular arcs), but the second irradiation path sections be smaller than the first irradiation path sections (e.g. be defined by circular arcs with a smaller radius).

The separating line T preferably runs parallel at a distance from M, in particular such that at least one maximum R1 on the one side of T is (according to absolute value) greater than at least one maximum R2 on the other side of T. In embodiments with circular arcs, R1 and R2 can correspond to the respective radius.

By a reversal point is meant in particular a point at which a component of the direction of the irradiation path, which runs parallel to the feed direction, changes sign or changes from "in the feed direction" to "against the feed direction", or vice versa.

The irradiation path preferably forms (as a furthering or as an independently inventive or as an independent aspect) at least in sections (in particular over at least an angular range of 45°, preferably at least 90°, still further preferably at least 135°, in particular) 180° an arc of a circle. In a preferred embodiment, the irradiation path in sections forms a (complete) semicircle. Preferably, the irradiation path is composed of a series of circular arcs (semicircles), whereby further preferably semicircles with a (comparatively) larger radius and semicircles with a (comparatively) smaller radius alternate, the latter corresponding in particular to sections that are directed in the opposite direction to the feed direction (or are directed backwards). In the first embodiment, all the circular arcs on the one side of a separating line T may have the same radius compared to each other and all the circular arcs on the other side of T may have the same (for example, smaller compared to the radius of the circular arcs on the one side) radius compared to each other. In further embodiments, different radii (for example at least two or at least three different radii) can also be realised on one side of T. On at least one side of T, optionally on both sides of T, there are (in each case) preferably at least 10, further preferably at least 100, still further preferably at least 1,000 circular arcs (in particular semicircles).

Alternatively or additionally, the irradiation path can extend in sections in the shape of an ellipse (as an ellipse arc; preferably over an angular range, with the ellipse centre point as the starting point, of at least 45°, further preferably at least 90°, still further preferably at least 135°, in particular 180°). Further preferably, the irradiation path forms a half ellipse in sections. In a specific embodiment, the irradiation path can have a plurality of ellipse arcs, in particular half-ellipses.

The irradiation path can also in sections be made of circular arcs, in particular semicircles, and in sections of ellipse arcs, preferably half-ellipses. Half-ellipses are preferably ellipse arcs that extend between the vertices of the ellipse intersecting the main axis. The main axis is, in particular, aligned parallel to the feed centre line M. In so far as the alternative ellipse or half-ellipse or ellipse arc is concerned, it is in particular not a circle (or sections thereof), even though a circle is sometimes considered a special case of an ellipse.

According to a still further embodiment, the irradiation path can at least in sections form an oval, in particular a half-oval. In particular, this shall not (necessarily) be a circular arc or an ellipse arc (or sections of such), even if circles and ellipses are sometimes regarded as special cases of an oval. An oval is preferably understood to be a closed, twice continuously differentiable convex curve in the plane. The respective (relevant) oval section or the respective (relevant) half-oval is preferably not closed (but may be twice continuously differentiable as well as convex and complementable to a closed oval).

Alternatively or additionally, the irradiation path can in sections be straight, in particular forming (at least) a triangular shape (comprising two sides of a triangle). Alternatively or additionally, the irradiation path can in sections be rectangular and/or trapezoidal. Insofar as the shape is important, the respectively described shape can be supplemented (mentally) by the centre line M in each case. In specific embodiments, larger triangular shapes (in feed direction) can alternate with smaller triangular shapes (against the feed direction) and/or larger rectangular shapes (in feed direction) can alternate with smaller rectangular shapes (against the feed direction) and/or larger trapezoidal shapes (in feed direction) can alternate with smaller trapezoidal shapes (against the feed direction). The relation smaller or larger shall preferably apply in feed direction and/or perpendicular thereto.

In embodiments, a forward movement may in particular result from different radii (i.e. different frequencies per half-wave). In particular, two (or more) frequencies may be alternated therewith.

In general, the formation of the irradiation path by successive circular arcs and/or ellipse arcs with a large half-axis in the feed direction and/or triangular sections and/or quadrilateral sections, in particular rectangular sections and/or trapezoidal sections, is to be regarded as an invention, which can be furthered according to the above and following explanations (with or, alternatively, without the requirement $p2/p1 \geq 2.0$ and/or the requirement $s1 \neq s2$). The respective sections shall preferably be designed such that the corresponding (closed) shape (e.g. triangle) results taking into account the separating line T.

A distance between a first intersection point of the irradiation path with M and a respective next-but-one intersection point with M and/or a respective fourth-but-one and/or sixth-but-one and/or eighth-but-one intersection point with M preferably remains constant. By this a comparatively continuous melting is made possible. The next-but-one intersection point is to be understood as the intersection point that is reached next-but-one when the irradiation path is traversed. The next-but-one intersection point here is therefore the one that is traversed time-wise after the starting point and after the next intersection point. Analogously, the fourth-next intersection point is the intersection point that is reached after the starting point and three further intersection points. Insofar as the respective distance remains constant, this shall apply over at least 10, preferably at least 100, further preferably at least 1,000 subsequent intersection points. The first intersection point can be a starting point (at the beginning of a row or column) or any intermediate point, which is then to be regarded as the first point.

A distance between a first reversal point (generally any starting point) of the irradiation path, at which a component of the direction of the irradiation path running parallel to the feed direction changes sign, and a respective next (and/or next-but-one and/or third-but-one and/or fourth-but-one) such reversal point, at which the change of sign is the same, preferably remains constant. By an equal change of sign is thus to be understood in particular that the irradiation path (in relation to the feed direction) changes in each case, for example, from "in feed direction" to "against the feed direction". In particular, this applies to at least 10, preferably at least 100, further preferably at least 1,000 subsequent reversal points with the same change of sign. Thus, a continuous and uniform melting can be achieved.

Preferably, at least one further, further preferably at least two further, still further preferably at least three further points, at which the irradiation path crosses the line parallel to M, in particular the feed centre line M, lies/lie (in terms of location) between P3 and P2. By this is achieved that the same section of the solidification path is crossed several times, so that a particularly gentle melting and re-solidification is possible.

Preferably, at least one change of direction with respect to the feed direction takes place between s1 and s2.

In general, s1 and s2 can be immediately successive maxima or s2 can be the maximum next-but-one to maximum s1 (or an even different maximum, for example the third- or fourth-next maximum).

The maxima s1 and s2 can lie on the same side of M or, alternatively, on different sides of M. In a specific embodiment, the maxima s1 and s2 lie on the same side of M as well as on another side of M at least one further maximum s3 (or s2'), which is in particular (according to absolute value) smaller than s1 (for example, according to absolute value equal to s2). Furthermore, on the other side there can be further maxima s4 (or s1') which are greater than s2 (for example equal according to absolute value to s1).

In a specific embodiment, the irradiation path of the beam comprises, among others, the points A, B, C, D and E, which are successively traversed, wherein point E is closer to point A than point C, wherein points B and D lie on different sides of M, wherein on a first section of the irradiation path lying between points A and C point D defines the maximum s1 and on a second section of the irradiation path lying between points C and E point D defines the maximum s2 (or s2').

The deviation from M preferably passes through at least a third (local) maximum s3, where (preferably) the following applies according to absolute value: $s3 \neq s1$ and/or $s3 \neq s2$.

Preferably applies: $s2 \leq 0.95 \ast s1$, optionally $s2 \leq 0.80 \ast s1$, and/or $s2 \geq 0.5 \ast s1$, preferably $s2 \geq 0.7 \ast s1$.

Preferably, a distance between at least one pair of (in terms of time, in particular directly) successive intersection points with the centre line M and/or a distance between at least one pair of (in terms of time, in particular directly) successive reversal points (with respect to the feed direction) is greater than a maximum lying between the two intersection points or reversal points (with respect to M; according to absolute value; perpendicular to the feed direction).

Preferably, the condition $p2/p1 \geq 2.0$; preferably $p2/p1 \geq 2.5$; further preferably $p2/p1 \geq 3.0$; further preferably $p2/p1 \geq 3.5$; further preferably $p2/p1 \geq 4.0$ is satisfied for a line array parallel to M, which in total covers at least 10%, optionally at least 30% or at least 50%, of the solidification path and/or covers at least 10%, optionally at least 30% or at least 50%, of an area between the two envelopes E1, E2.

Between two (directly successive) intersection points with M and/or T there can be (exactly) one (local) maximum or there can be several (local) maxima.

Preferably, at least one point of the solidification path or at least one point in the area between the envelopes is swept at least twice, possibly at least three times, by the impinging beam and/or at least by an effective area associated with the impinging beam (when traversing a specific row or column). This at least one point can be a crossing point (at which the irradiation path intersects itself) or a point which is not a crossing point, in particular is at a distance of at least half a beam diameter of the impinging beam (or at least half a diameter of the warm-up area) from a next crossing point. The above condition of sweeping at least twice may possibly apply to a plurality (or a continuum) of points that form in terms of area at least 10%, preferably at least 25%, optionally at least 50% or at least 80% of the area between the envelopes. The above condition may alternatively or additionally apply to at least one point lying on the centre line M (preferably: to at least 50% of such points) and/or to at least one point lying on the separating line T (preferably: to at least 50% of such points).

A diameter of the effective area (warm-up area) of the impinging beam can be derived from the diameter of the impinging beam, in particular (deliberately simplifying) be assumed to be 2.5 times as large as the diameter of the impinging beam. For example, with a d$86$ of 80 µm, the impinging laser beam preferably leads to heating in an effective area with a diameter of (approx.) 200 µm (around the respective centre of the irradiation path). The heating of the effective area can (depending on the point in time) result in preheating or sintering or (at a later point in time) in a melt pool, which is generated by the radiation source (in particular by the laser).

The above-mentioned object is further solved by an irradiation unit, in particular for carrying out the method of the above type, for one (or a) manufacturing apparatus for additively manufacturing three-dimensional components by layer-by-layer application of a build-up material by means of at least one coating unit and locally selective solidification of the build-up material by at least one beam impinging on the build-up material and following a feed direction, wherein a control unit is provided and configured to control an irradiation path of the impinging beam such that the irradiation path of the impinging beam deviates during the feed from an, in particular straight, feed centre line M, wherein at least one line P parallel to M or corresponding to M is successively crossed by the irradiation path at three points P1, P2 and P3, so that applies:

P2 lies further forward in the feed direction than P1 and P3 lies between P1 and P2, at a distance p1 from P1 and at a distance p2 from P2, where: p2/p1≥2.0, preferably p2/p1≥3.5.

The above-mentioned object is further solved by an irradiation unit, in particular of the above type, preferably for carrying out the above method, for one (or a) manufacturing apparatus for additively manufacturing three-dimensional components by layer-by-layer application of a build-up material by means of at least one coating unit and locally selective solidification of the build-up material by at least one beam impinging on the build-up material and following a feed direction, wherein a control unit is provided and configured to control an irradiation path of the impinging beam such that the irradiation path of the impinging beam deviates from a, in particular straight, feed centre line M during the feed, wherein a deviation from M passes through at least two at least local maxima s1 and s2, where according to absolute value applies: s1≠s2.

According to the embodiment, the irradiation unit, in particular its control unit, is configured to perform the method described above and/or below.

The above-mentioned object is further solved by a manufacturing device for additively manufacturing three-dimensional components, configured to perform the above method and/or comprising an irradiation unit of the above type and at least one coating unit.

The (powdery) build-up material preferably comprises at least one metal and/or at least one ceramic material and/or at least one plastic, preferably polymer. The metal may for example comprise aluminium, titanium, nickel, iron, tungsten, molybdenum and/or alloys thereof. Particularly preferably, the (powdery) build-up material comprises copper. Preferably, the build-up material is composed of at least 10% by weight, further preferably 50% by weight, still further preferably at least 80% by weight, still further preferably at least 99% by weight or 99.99% by weight or 100% by weight of one (in particular one of the above) or at least one (in particular several of the above) metal(s).

Two adjacent solidification paths may be formed overlapping, abutting or spaced apart.

A speed in the feed direction may be at least 500 mm/s, preferably at least 2,000 mm/s and/or at most 20,000 mm/s. According to the embodiment, for example, a semicircle with a radius R1 can be formed, followed by a further semicircle with a radius R2, followed by a half-ellipse with a (in particular small) half-axis r3 and a further half-ellipse with a (in particular small) half-axis r4 (possibly repeating cyclically). Preferably, R1 is greater than R2 and/or greater than r3 and/or greater than r4. Alternatively or additionally, R2 is greater than r3. Alternatively or additionally, r4 is greater than r3.

Possibly, no irradiation of the build-up material follows on the centre line M and/or (directly) adjacent to it, since this (then non-irradiated) centre can possibly be surfused.

The irradiation path can be interrupted in alternative embodiments (e.g. over at least 1%, possibly at least 5% and/or at most 20%, possibly at most 10%). For this purpose, a deflection unit can possibly continue to move, but irradiation may be suspended, in particular an irradiation source, preferably a laser, may be switched off.

In the case of an interrupted irradiation path, this can, if necessary, be supplemented with regard to the above definitions to form a closed theoretical irradiation path. In particular, as theoretical irradiation path is to be understood the path that would result if the irradiation were not switched off in sections and/or the path that implies a straight continuation in interruption sections.

A sum R1+R2 and/or a sum r3+r4 can for example be selected depending on a width of a thermal effective area and/or depending on the diameter of the irradiation focus (laser focus) and/or depending on the path speed. Preferably, r3+r4 always corresponds to at least R1+R2 minus a width of the thermal effective area of the impinging beam resulting from the irradiation focus (laser focus). For example, depending on the parameterisation and material, an overlap of resulting melt pools can be realised.

The solidification path width (and/or distance of the envelopes to each other) can be at least 10 µm, further preferably at least 100 µm and/or at most 5000 µm, possibly at most 2,000 µm.

The (additive) manufacturing device according to the invention and the corresponding manufacturing method are generally characterised in that objects (components) can be manufactured layer by layer by solidifying a (in particular amorphous) build-up material. The solidification can be brought about by supplying thermal energy to the build-up material by irradiating it with electromagnetic radiation or particle radiation, for example in laser sintering ("SLS" or "DMLS"), laser melting or electron beam melting. Preferably, the manufacturing device is designed as a laser sintering or laser melting device. In laser sintering or laser melting, the area of impact of the laser beam (laser spot) on a layer of the build-up material is moved over those points of the layer which correspond to the component cross-section of the component to be produced in this layer. Therein, a thin layer of a powdery build-up material is repeatedly (after each lowering of the building plane) applied and the build-up material is selectively locally solidified in each layer by selective irradiation with at least one laser beam.

A building plane is to be understood in particular as a two-dimensional region (2D partial region) of a working plane of the manufacturing device for additively manufacturing, in which the beams of the at least one irradiation unit for selective solidification can impinge on the build-up material or in which a construction container extends which receives the component and which can (also) contain the (unsolidified) build-up material. In this respect, the surface of the building plane can be used for production. In particular, the building plane can be understood as the uppermost powder layer (2D surface). The building plane is preferably round, in particular at least substantially circular, but may also assume other shapes, for example rectangular, in particular square.

BRIEF DESCRIPTION OF THE DRAWINGS

In the following, the invention will be described with reference to exemplary embodiments, which will be explained in more detail with reference to the figures. Preferably, the distance between two successive intersection points with the centre line M and/or the distance between two successive reversal points (with respect to the feed direction) is greater than a maximum (according to absolute value;
perpendicular to the feed direction) lying between the two intersection points or reversal points.

Hereby show:

FIG. 8 a schematic section of an irradiation path according to the invention according to a further alternative;

FIG. 9 a schematic section of an irradiation path according to the invention according to a further alternative;

FIG. 10 a schematic section of an irradiation path according to the invention according to a further alternative;

FIG. 11 a schematic section of an irradiation path according to the invention according to a further alternative;

FIG. 12 a schematic section of an irradiation path according to the invention according to a further alternative;

DETAILED DESCRIPTION OF THE EMBODIMENTS

Figure 1:
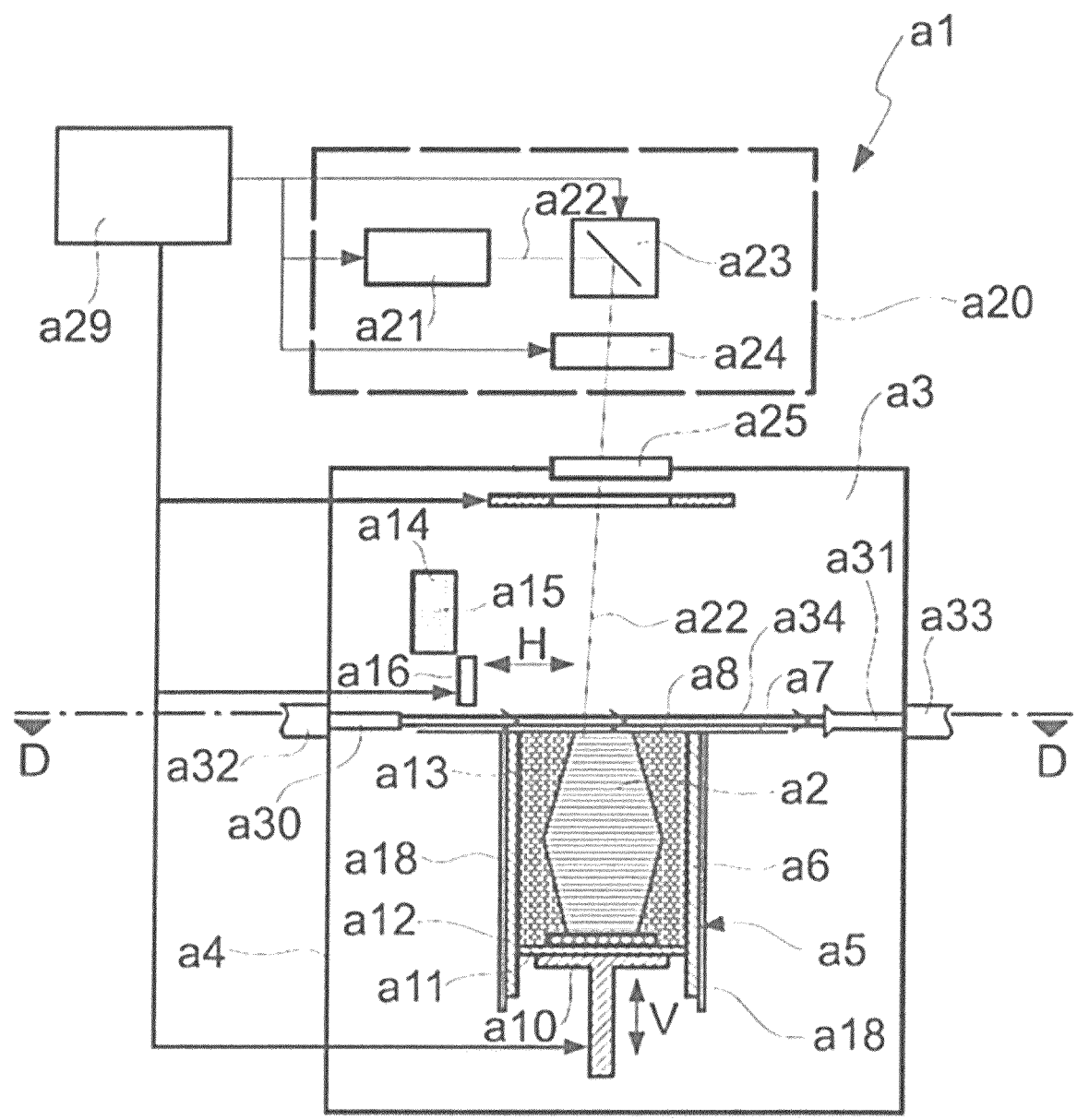
FIG. 1 a schematic illustration, partially reproduced as a cross-section, of a device for building up a three-dimensional object layer by layer.

In the following description, the same reference numerals are used for identical and similarly acting parts.

The device shown in FIG. 1 is a laser sintering or laser sintering device a1 known per se. For building up an object a2 it contains a process chamber a3 with a chamber wall a4. In the process chamber a3, an upwardly open construction container a5 with a wall a6 is arranged. A working plane a7 is defined by the upper opening of the construction container a5, whereby the area of the working plane a7 lying within the opening, which can be used to build the object a2, is referred to as the building plane a8. In the construction container a5 a carrier a10, which is movable in a vertical direction V, is arranged, to which a base plate a11 is attached, which closes off the construction container a5 at the bottom and thus forms its base. The base plate a11 may be a plate formed separately from the carrier a10 which is attached to the carrier a10, or it may be formed integrally with the carrier a10. Depending on the powder and process used, on the base plate a11 may also be formed a building platform a12 on which the object a2 is built up. The object a2 can, however, also be built on the base plate a11 itself, which then serves as the building platform. In FIG. 1, the object a2 to be formed in the construction container a5 on the building platform a12 is shown below the working plane a7 in an intermediate state with several solidified layers surrounded by build-up material a13 that has remained unsolidified. The laser sintering device a1 further comprises a storage container a14 for a powdery build-up material a15 solidifiable by electromagnetic radiation and a coater a16 movable in a horizontal direction H for applying the build-up material a15 to the building plane a8. The laser sintering device a1 further comprises an exposure device a20 with a laser a21 which generates a laser beam a22 as an energy beam bundle which is deflected via a deflection device a23 and focused onto the working plane a7 by a focusing device a24 via a coupling window a25 which is arranged on the upper side of the process chamber a3 in its wall a4.

Further, the laser sintering device a1 includes a control unit a29 via which the individual components of the laser sintering device a1 are controlled in a coordinated manner to perform the building process. The control unit a29 may include a CPU whose operation is controlled by a computer program (software). The computer program may be stored separately from the device on a storage medium from which it can be loaded into the device, in particular into the control unit. In operation, to apply a powder layer, the carrier a10 is first lowered by a height corresponding to the desired layer thickness.

By moving the coater a16 over the working plane a7, then a layer of the powdery build-up material a15 is applied. For safety, the coater a16 pushes a slightly larger amount of build-up material a15 in front of it than is required to build up the layer. The scheduled excess of build-up material a15 is pushed by the coater a16 into an overflow container a18.

On both sides of the build-up container a5 an overflow container a18 each is arranged. The application of the powdery build-up material a15 is done at least over the entire cross-section of the object a2 to be produced, preferably over the entire building plane a8, i.e. the area of the working plane a7, which can be lowered by a vertical movement of the carrier a10. Subsequently, the cross-section of the object a2 to be produced is scanned by the laser beam a22 with a radiation impact area (not shown), which schematically represents an intersection of the energy beam bundle with the working plane a7. As a result, the powdery build-up material a15 is solidified at points which correspond to the cross-section of the object a2 to be produced. These steps are repeated until the object a2 is completed and can be removed from the construction container a5.

For generating a preferably laminar process gas flow a34 in the process chamber a3, the laser sintering device a1 further comprises a gas supply channel a32, a gas inlet nozzle a30, a gas outlet opening a31 and a gas discharge channel a33. The process gas flow a34 moves horizontally across the building plane a8. The gas supply and discharge may also be controlled by the control unit a29 (not shown). The gas extracted from the process chamber a3 may be fed to a filter device (not shown), and the filtered gas may be fed back to the process chamber a3 via the gas supply channel a32, forming a recirculation system with a closed gas circuit. Instead of only one gas inlet nozzle a30 and one gas outlet opening a31, several nozzles or openings can be provided in each case.

Figure 2:
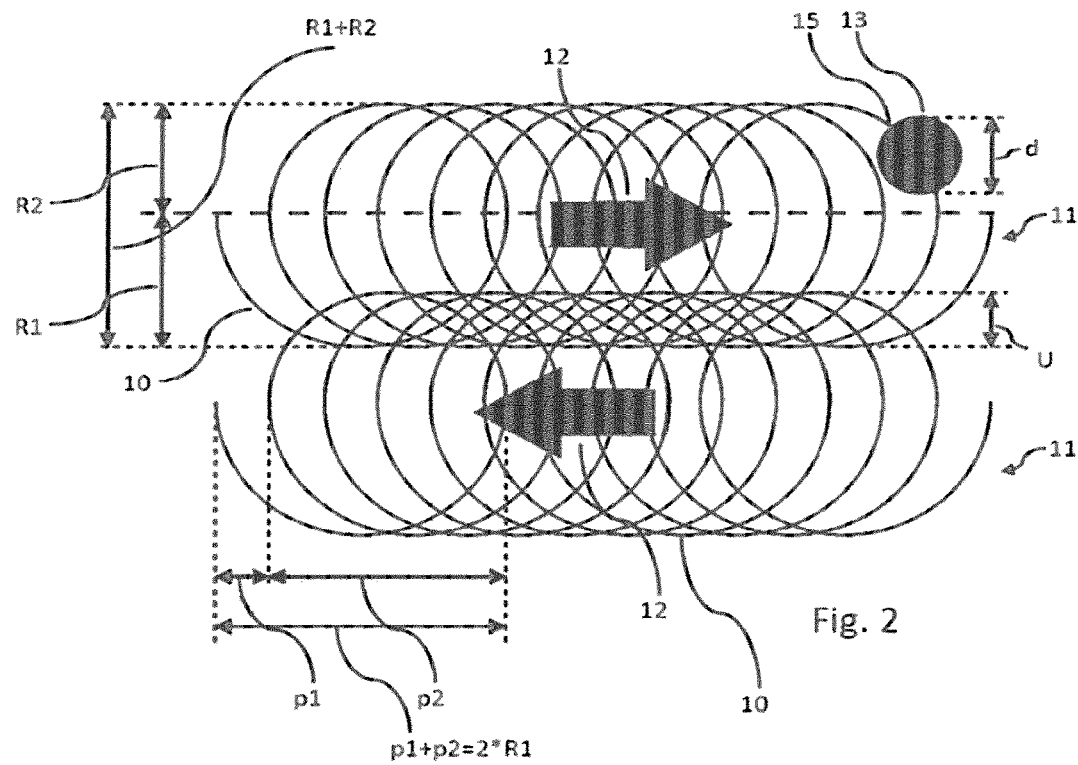
FIG. 2 a schematic representation of sections of an irradiation path according to the invention.

FIG. 2 shows sections of two irradiation paths 10, which are part of two partially overlapping solidification paths 11 formed by the irradiation paths 10. While the irradiation paths 10 are curvilinear per se, the solidification paths 11 are straight-lined.

The irradiation paths 10 define the path of the impinging beam (or its centre). In the (in FIG. 2 upper) solidification path 11 a feed occurs in a feed direction 12 from left to right; in the (in FIG. 2 lower) solidification path 11 from right to left. A thermal effective area 13 of the impinging beam is marked by a black circle; the respective feed direction 12 by a black arrow.

The respective irradiation path 10 is composed in each case of larger semicircles and smaller semicircles arranged alternately. The larger semicircles have a radius R1, the smaller semicircles have a radius R2. Because R2<R1 applies, a feed is realised. If a larger semicircle and a subsequent smaller semicircle are traversed once, this feed corresponds to the distance p1. The distance p1 is markedly smaller than p2. In the present case, the distance p2 is again the difference of the diameter 2*R1 of the larger semicircle minus p1(i.e. p2=2*R1−p1 or p2=2*R2). Specifically, the following shall apply in particular: $p2/p1 \geq 2.0$, preferably $p2/p1 \geq 2.5$, still further preferably $p2/p1 \geq 3.0$, still further preferably $p2/p1 \geq 3.5$, still further preferably $p2/p1 \geq 4.0$.

Furthermore, it can be seen in FIG. 2 that an overlap U is markedly smaller than a sum of the radii R1+R2. Preferably applies (in particular also generalised to shapes of the irradiation path 10 which deviate from FIG. 2, in which case R1+R2 would have to be replaced by an envelope distance): $(R1+R2)/U \geq 2.0$, preferably $\geq 3.0$. For a diameter d of the thermal effective area 13 of an impinging beam 15, it preferably applies that this diameter d is (markedly) smaller than R1+R2, where preferably applies (in particular also generalised to shapes of the irradiation path 10 which deviate from FIG. 2, in which case R1+R2 would have to be replaced by an envelope distance): $(R1+R2)/D \geq 1.5$, preferably $\geq 2.5$.

Furthermore, it can be derived from FIG. 2 that the impinging beam or at least the thermal effective area 13 of the impinging beam sweeps at least twice over a better part of all points within the two envelopes E1, E2 (due to the diameter d and due to the fact that path sections adjacent to a given path section are comparatively close, in particular in some cases even have a distance from each other that is smaller than d, which applies, for example, to path sections that run close to the envelopes E1, E2). These points preferably form at least 50%, possibly at least 80% of the area between the envelopes E1, E2. However, this is not mandatory, especially since the zone heated by the impinging beam or the irradiation path may be larger than the beam diameter.

Figure 3:
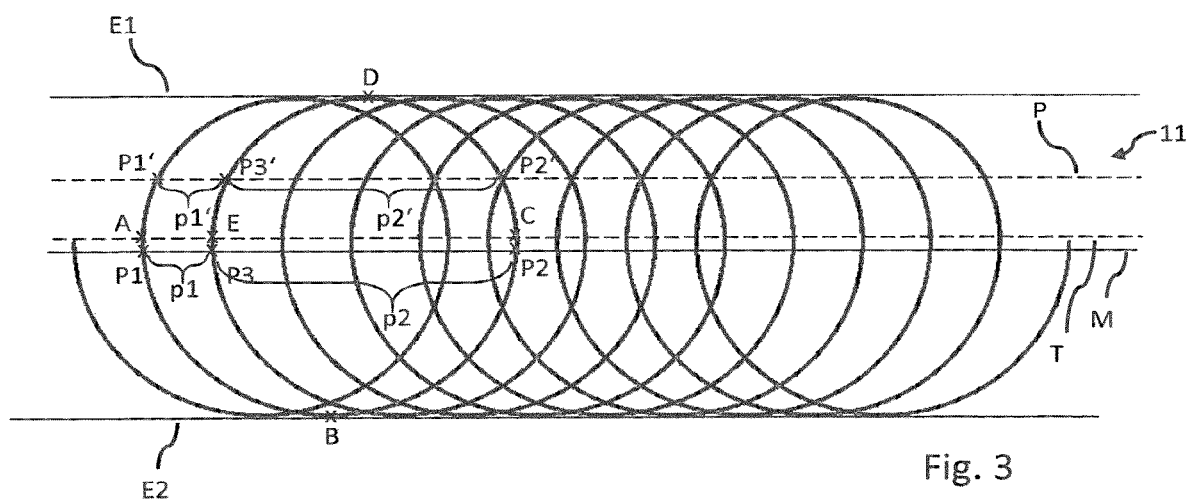
FIG. 3 a schematic representation of an irradiation path according to the invention.

In FIG. 3, a schematic irradiation path 10 analogous to FIG. 2 is shown enlarged and with further labelling and explanatory lines. First, a feed centre line M is visible in FIG. 3. Due to the different dimensioning of the semicircles of the irradiation path 10, this centre line M does not correspond to an (imaginary) separating line T which separates the large semicircles from the small semicircles. The feed centre line M is arranged (exactly) centrally between the envelopes E1 and E2, thus defining a geometric centre of the area lying between the envelopes E1 and E2 (or a centre of the solidification path 11).

Furthermore, points A, B, C, D and E are marked in FIG. 3. These are passed through successively by the impinging beam 15. Points A, C and E form reversal points at which the impinging beam 15 changes its direction (in relation to the feed direction 12=main propagation direction or solidification path propagation direction).

In FIG. 3, in addition to the feed centre line M, two lines parallel to this feed centre line M, namely a separating line T and a further (arbitrary parallel) line P are also drawn. These lines are crossed at the points P1, P2 and P3 or A, E and C or P1', P2' and P3'. For all these lines at least $p2(')/p1(') \geq 2.0$ applies. This in turn means that P3 (') is comparatively close to P1 (') and thus the same areas in relation to the feed direction or all areas of the solidification path 11 are traversed several times or in particular even (depending on the beam diameter d) all areas are traversed at least twice. In particular, if applies: $d \geq p1(')$ for all possible p1('), the latter condition is fulfilled.

Figure 4:
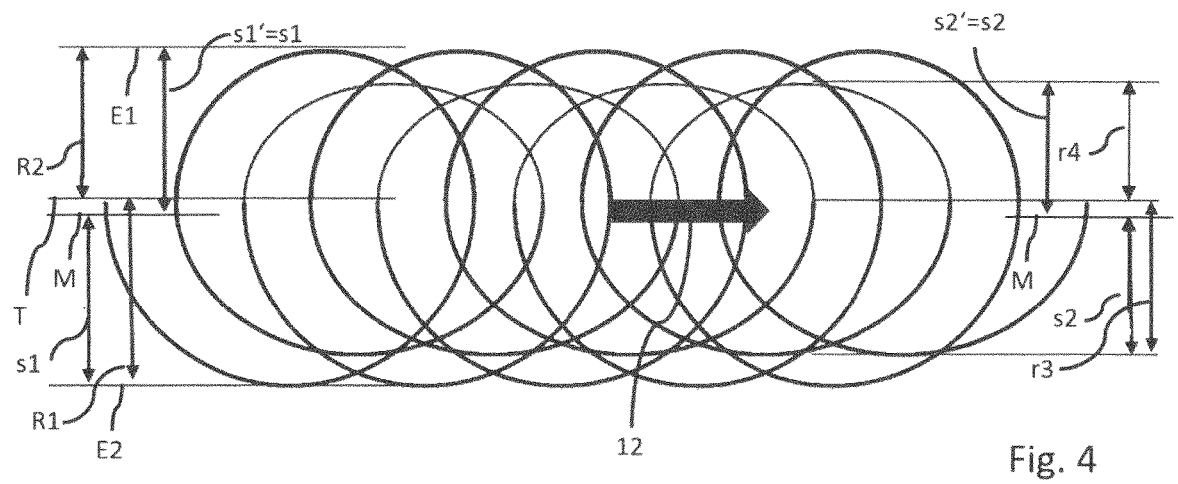
FIG. 4 a schematic representation of a section of an irradiation path according to the invention according to an alternative embodiment.

FIG. 4 shows an alternative embodiment in which (analogous to FIGS. 2 and 3) also larger and smaller semicircles are traversed, but in addition also larger as well as smaller half-ellipses. The respective smaller semicircle and the respective smaller half-ellipse are located above a separating line T (in the graphic representation according to FIG. 4, whereby "above" is not intended to actually mean "in the space above"). The respective larger semicircle and the respective larger half-ellipse are arranged below the separating line T. Due to the different sizes of the semicircles and half-ellipses, the separating line T in this case is also above the actual feed centre line M (which lies centrally between the envelopes E1 and E2). Successively follow each other preferably: large semicircle-large half-ellipse-small semicircle-small ellipse (periodically repeating).

The large semicircle has the radius R1. The small semicircle has the radius R2. The large half-ellipse has the small half-axis r3. The small half-ellipse has the small half-axis r4. The respective half-axis of the respective half-ellipse thus extends perpendicular to the feed direction 12. The large half-axis of the large half-ellipse has the value R1 and the large half-axis of the small half-ellipse has the value R2.

By the large semicircles a plurality of maxima with absolute value s1 (with respect to M) on the one side of M. By the small semicircles a plurality of maxima with the absolute value s1' (=s1) (with respect to M) is formed on the other side of M. By the large half-ellipses a plurality of maxima with the absolute value s2 (with respect to M) is formed on the one side of M. By the small half-ellipses a plurality of maxima with the absolute value s2' (=s2) (with respect to M) is formed on the other side of M.

Figure 5:
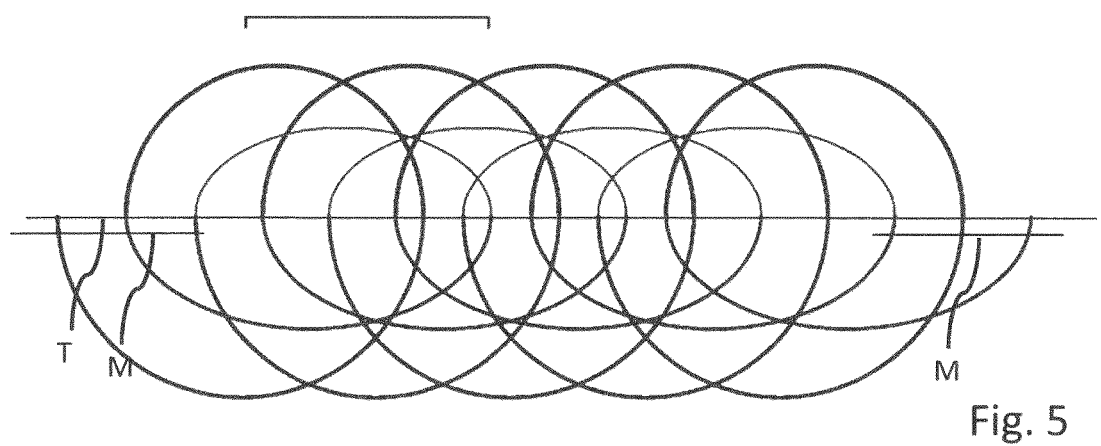
FIG. 5 a schematic representation of a section of a further irradiation path according to the invention.

FIG. 5 shows an embodiment analogous to FIG. 4, but with, relative to the semicircles, smaller half-ellipses (or on an extension perpendicular to the feed direction 12). Preferably applies: r3+r4≤(R1+R2)−d, preferably r3+r4≤(R1+R2−d)/1.2.

Figure 6:
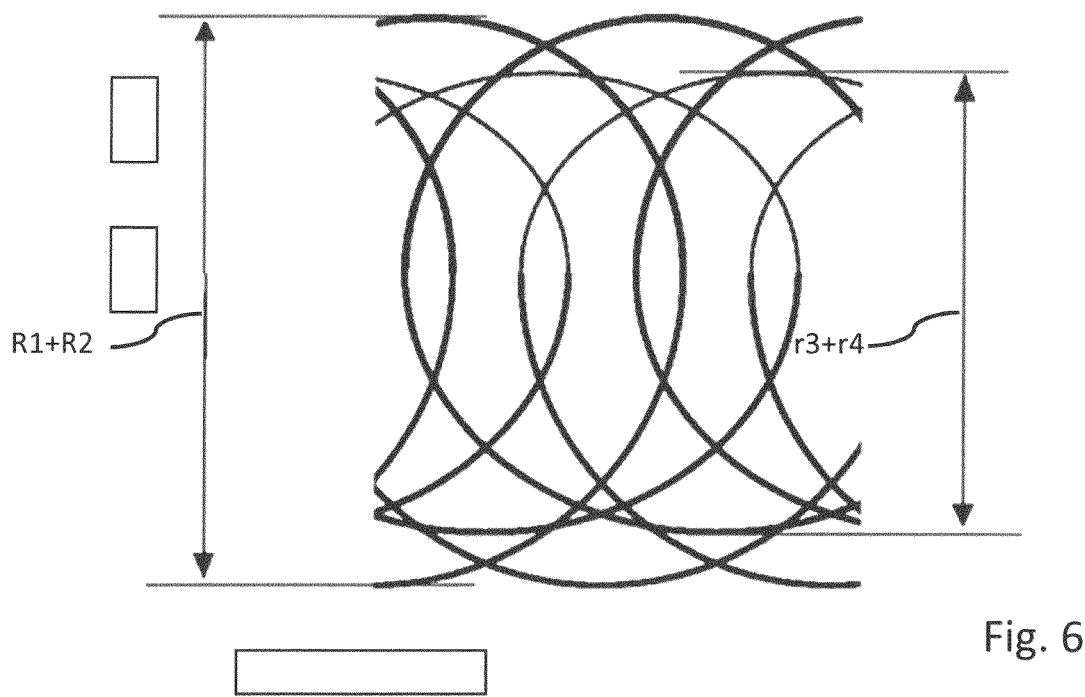
FIG. 6 a schematic section of an irradiation path according to the invention.

In FIG. 6 the control variables R1+R2 and r3+r4 are shown again. In this respect, there may be further control variables, e.g. r5+r6, which can be formed, for example, by ellipse(arc)s, which (at least perpendicular to the feed direction 12) are even smaller than the ellipse(arc)s with the small half-axes r3 or r4. Also, in FIGS. 4-6 the semicircles can be replaced by corresponding half-ellipses, or by still other shapes (see FIGS. 8-12).

Figure 7:
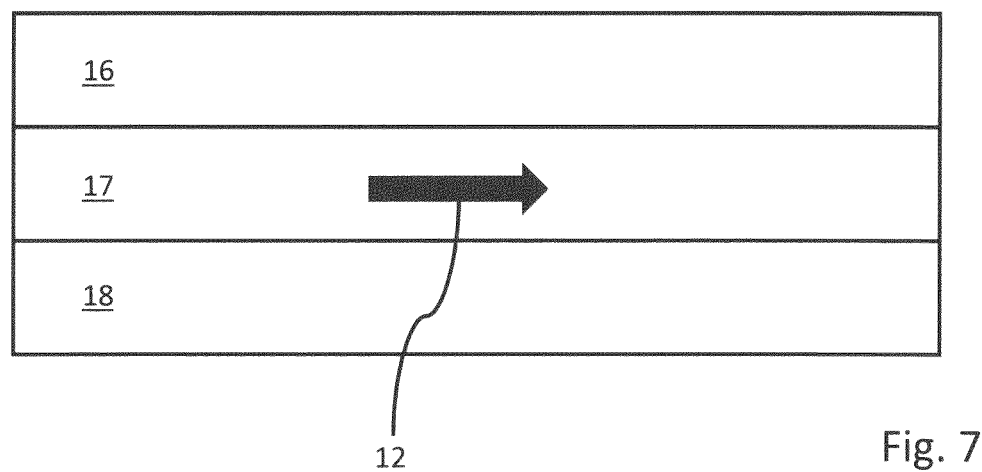
FIG. 7 a schematic representation of a solidification path.

The embodiment according to FIGS. 4-6 is further (additionally) advantageous compared to the embodiment according to FIGS. 2 and 3. This is explained with reference to FIG. 7. FIG. 7 shows (highly schematic) the solidification path resulting from the irradiation (or a section thereof). This solidification path can be divided into a first zone 16, a second zone 17 and a third zone 18. Experiments have now shown that in the embodiment according to FIGS. 2 and 3, the outer (or first and third) zones 16, 18 become comparatively hotter than the middle (or second) zone 17. This inhomogeneous temperature distribution in a direction perpendicular to the feed direction can possibly lead to stresses, which in turn can lead to defects in the manufactured product. A risk for this is reduced by the embodiment according to FIGS. 4-6, since the temperature distribution perpendicular to the feed direction 12 can thereby be at least partially homogenised. By this the risk of stresses and corresponding defects in the object is lowered.

According to FIGS. 8-12, further embodiments of the invention are shown (highly schematic). In each case, a section of the irradiation path of the impinging beam is shown. In FIG. 8, this irradiation path (analogous to FIGS. 2-6) comprises a smaller and a larger semicircle, separated by the separating line T. In FIG. 9, the irradiation path comprises a smaller and a larger rectangular shape, separated by the separating line T. In FIG. 10, the irradiation path comprises a larger and a smaller triangular shape, separated by the separating line T. In FIG. 11 the irradiation path comprises a larger (in relation to the feed direction 12) and a smaller half-ellipse, separated by the separating line T. In FIG. 12 the irradiation path comprises a larger and a smaller oval arc, separated by the separating line T, whereby here too the size refers to the extension perpendicular to the feed direction 12.

The respective (complete) irradiation path (for example over a row or column) can be constructed exclusively from the shapes respectively shown in the individual figures or (as for example in the embodiment according to FIGS. 4-6) can be constructed from several of these shapes (for example from semicircles and half-ellipses according to FIGS. 8 and 11, or half-ellipses and half-ovals according to FIGS. 11 and 12, or half-ellipses basically according to FIG. 11, but with still further, differing, ellipse sizes etc.).

Example of Execution:

An EOS-M270-3D printer (year of manufacture 2018) from EOS GmbH was used. A 316L stainless steel powder from EOS GmbH was used. For the exposure, a laser power of 370 W was used with a focus d86=80 μm and a width of the thermal effective area 13 of the impinging beam generated by the laser of (approx.) 200 μm. The generated layer thickness was 20 μm.

As radius R1 500 μm and as radius R2 400 μm were set. An overlap between adjacent solidification paths was 75 μm. The velocity of the laser path was between 1700 mm/s and 2700 mm/s. A material density of 99.9% was achieved for the samples.

Aspect 1: Method for additively manufacturing three-dimensional components by layer-by-layer application of a build-up material and locally selective solidification of the build-up material by at least one beam (15) impinging on the build-up material and following a feed direction (12), wherein an irradiation path (10) of the impinging beam (15) deviates during the feed from a, in particular straight, feed centre line M, wherein at least one line (L, M, T) parallel to M or corresponding to M is successively crossed by the irradiation path (10) at three points P1, P2 and P3, so that applies:

P2 lies further forward in the feed direction than P1 and P3 lies between P1 and P2, at a distance p1 from P1 and a distance p2 from P2, where: p2/p1≥2.0; preferably p2/p1≥3.5.

Aspect 2: Method for additively manufacturing three-dimensional components, in particular according to aspect 1, by layer-by-layer application of a build-up material and locally selective solidification of the build-up material by at least one beam (15) impinging on the build-up material and following a feed direction (12), wherein an irradiation path (10) of the impinging beam (15) deviates during the feed from a, in particular straight, feed centre line M, wherein a deviation from M passes through at least two at least local maxima s1 and s2, wherein according to absolute value applies: s1≠s2.

Aspect 3: Method according to one of the preceding aspects 1 or 2, wherein the irradiation path (10) runs such that a dividing line is defined, wherein the irradiation path comprises first and second irradiation path sections which are separated from one another by the separating line T, wherein reversal points of the irradiation path preferably lie on the separation line and/or wherein a shape of the second irradiation path sections preferably corresponds to a shape of the first irradiation path sections, but the second irradiation path sections are smaller than the first irradiation path sections, wherein the separating line T preferably runs parallel at a distance from M, in particular such that at least one maximum R1 on one side of T is greater than at least one maximum R2 on the other side of T.

Aspect 4: Method according to one of the preceding aspects 1 to 3, wherein the irradiation path (10) in sections forms an arc of a circle, in particular a semicircle, and/or wherein the irradiation path (10) in sections forms an ellipse arc, in particular a half-ellipse.

Aspect 5: Method according to one of the preceding aspects 1 to 4, wherein the irradiation path (10) is straight in sections, in particular forms a triangular shape.

Aspect 6: Method according to one of the preceding aspects 1 to 5, wherein a distance between a first point of intersection of the irradiation path (10) with M and a respective next-but-one point of intersection with M remains constant.

Aspect 7: Method according to one of the preceding aspects 1 to 6, wherein a distance between a first reversal point (A) of the irradiation path, at which a component of the direction of the irradiation path running parallel to the feed direction changes sign, and a respective next such reversal point (C), at which the change in sign is the same, remains constant.

Aspect 8: Method according to one of the preceding aspects 1 to 7, wherein between P3 and P2 there is at least one further, preferably at least two further, further preferably at least three further points at which the irradiation path crosses the line P, in particular M.

Aspect 9: Method according to one of the preceding aspects 2 to 8, wherein between s1 and s2 at least one change of direction with respect to the feed direction (12) takes place.

Aspect 10: Method according to one of the preceding aspects 2 to 9, wherein s1 and s2 are on the same side of M or on different sides of M.

Aspect 11: Method according to one of the preceding aspects 2 to 10, wherein an irradiation path of the beam comprises, inter alia, the points A, B, C, D and E which are successively traversed,
wherein the point E is closer to point A than the point C,
wherein the points B and D are on different sides of M,
wherein, on a first section of the irradiation path (10) lying between points A and C, point B defines the maximum s1 and, on a second section of the irradiation path lying between points C and E, point D defines the maximum s2.

Aspect 12: Method according to one of the preceding aspects 2 to 11, wherein the deviation from M passes through at least a third local maximum s3, wherein according to absolute value applies: s3≠s1 and/or s3≠s2.

Aspect 13: Method according to one of the preceding aspects 2 to 12, wherein applies: s2≤0.95*s1, optionally s2≤0.80*s1, and/or s2≥0.5*s1, preferably s2≥0.7*s1.

Aspect 14: Irradiation unit for a manufacturing device for additively manufacturing three-dimensional components by layer-by-layer application of a build-up material by means of at least one coating unit and locally selective solidification of the build-up material by at least one beam impinging on the build-up material and following a feed direction (12), wherein a control unit is provided and configured to control an irradiation path (10) of the impinging beam (15) such that the irradiation path of the impinging beam (15) deviates during the feed from a, in particular straight, feed centre line M, wherein at least one line P parallel to M or corresponding to M is successively crossed by the irradiation path (10) at three points P1, P2, and P3, so that applies:
P2 lies further forward in the feed direction (12) than P1 and
P3 lies between P1 and P2, at a distance p1 from P1 and a distance p2 from P2, where: p2/p1≥2.0, preferably p2/p1≥3.5.

Aspect 15: Irradiation unit, preferably according to aspect 14, for a manufacturing device for additively manufacturing three-dimensional components by layer-by-layer application of a build-up material by means of at least one coating unit and locally selective solidification of the build-up material by at least one beam (15) impinging on the build-up material and following a feed direction, wherein a control unit is provided and configured to control an irradiation path (10) of the impinging beam (15) such that the irradiation path (10) of the impinging beam (15) during the feed deviates from a, in particular straight, feed centre line M, wherein a deviation from M passes through at least two at least local maxima s1 and s2, wherein according to absolute value applies: s1≠s2.

Aspect 16: Manufacturing device for additively manufacturing three-dimensional components, configured for carrying out the method according to one of aspects 1 to 13 and/or comprising an irradiation unit according to one of aspects 14 or 15 and at least one coating unit.

LIST OF REFERENCE NUMERALS a1 laser sintering or laser melting device
a2 object
a3 process chamber
a4 chamber wall
a5 construction container
a6 wall
a7 working plane
a8 building plane
a10 movable carrier
a11 base plate
a12 building platform
a13 unsolidified build-up material
a14 storage container
a15 powdery build-up material
a16 movable coater
a20 exposure device
a21 laser
a22 laser beam
a23 deflection device
a24 focusing device
a25 coupling window
a29 control unit
a30 gas inlet nozzle
a31 gas outlet opening
a32 gas supply channel
a33 gas discharge channel
a34 laminar process gas flow
A-E points
d diameter of the thermal effective area 13
E1, E2 envelopes
L line
M feed centre line
P1(')-P3(') points
p1, p2 distances
R1 radius (large semicircle)
R2 radius (small semicircle)
r3 small half-axis (of the large ellipse arc)
r4 small half-axis (of the small ellipse arc)
s1,s1',s2,s2' maxima
T separating line
10 irradiation path
11 solidification path
12 feed (direction)
13 thermal effective area of the impinging beam
15 impinging beam
16 first zone
17 second zone
18 third zone

The invention claimed is:

1. A method for additively manufacturing three-dimensional components by layer-by-layer application of a build-up material and locally selective solidification of the build-up material, the method comprising:
impinging at least on beam on the build-up material, the at least one beam following a feed direction,
wherein an irradiation path of the at one beam deviates during a feed from a feed center line M, wherein at least one line (L, M, T) parallel to M or corresponding to M is successively crossed by the irradiation path at three points P1, P2 and P3, so that applies:
P2 lies further forward in the feed direction than P1; and
P3 lies between P1 and P2, at a distance p1 from P1 and a distance p2 from P2, where: p2/p1>3.0;
wherein at least one maximum of a deviation from M in a section of the irradiation path between P1 and P2 is a point-shaped maximum and/or at least one maximum of a deviation is a line-shaped maximum with a length l for which applies: l≤0.30*(p1+p2).

2. The method according to claim 1,
wherein the irradiation path of the impinging beam deviates during the feed from the feed center line M, wherein a deviation from M passes through at least two at least local maxima s1 and s2, wherein according to absolute value applies: s1≠s2.

3. The method according to claim 2, wherein between s1 and s2 at least one change of direction with respect to the feed direction takes place.

4. The method according to claim 2, wherein s1 and s2 are on the same side of M or on different sides of M.

5. The method according to claim 2, wherein an irradiation path of the beam comprises, the points A, B, C, D and E which are successively traversed,
wherein the point E is closer to the point A than the point C,
wherein the points B and D are on different sides of M,
wherein, on a first section of the irradiation path lying between points A and C, point B defines the maximum s1 and, on a second section of the irradiation path lying between points C and E, point D defines the maximum s2.

6. The method according to claim 2, wherein the deviation from M passes through at least a third local maximum s3, wherein according to absolute value applies: s3≠s1 and/or s3≠s2.

7. The method according to claim 2, wherein applies: s2≤0.95*s1.

8. The method according to claim 1, wherein the irradiation path runs such that a separating line T is defined, wherein the irradiation path comprises first and second irradiation path sections which are separated from one another by the separating line T, wherein reversal points of the irradiation path lie on the separating line T and/or wherein a shape of the second irradiation path sections corresponds to a shape of the first irradiation path sections, but the second irradiation path sections are smaller than the first irradiation path sections, wherein the separating line T runs parallel at a distance from M, such that at least one maximum R1 on one side of T is greater than at least one maximum R2 on ananother side of T.

9. The method according to claim 1, wherein the irradiation path in sections forms an arc of a circle, and/or wherein the irradiation path in sections forms an ellipse arc.

10. The method according to claim 1, wherein the irradiation path is straight in sections.

11. The method according to claim 1, wherein a distance between a first point of intersection of the irradiation path with M and a respective next-but-one point of intersection with M remains constant.

12. The method according to claim 1, wherein a distance between a first reversal point of the irradiation path, at which a component of the direction of the irradiation path running parallel to the feed direction changes sign, and a respective next such reversal point, at which the change in sign is the same, remains constant.

13. The method according to claim 1, wherein between P3 and P2 there is at least one further point at which the irradiation path crosses a line P and wherein P is parallel to M.

14. An irradiation unit, for carrying out the method according to claim 1, for a manufacturing device for additively manufacturing three-dimensional components by layer-by-layer application of a build-up material by means of at least one coating unit and locally selective solidification of the build-up material by at least one beam impinging on the build-up material and following a feed direction, wherein a control unit is provided and configured to control an irradiation path of the impinging beam such that the irradiation path of the impinging beam deviates during the feed from a feed center line M, wherein at least one line P parallel to M or corresponding to M is successively crossed by the irradiation path at three points P1, P2, and P3, so that applies:
P2 lies further forward in the feed direction than P1 and P3 lies between P1 and P2, at a distance p1 from P1 and a distance p2 from P2, where: p2/p1≥3.5,
wherein at least one maximum of a deviation from M in a section of the irradiation path between P1 and P2 is a point-shaped maximum and/or at least one such maximum is a line-shaped maximum with a length 1 for which applies: 1≤0.30*(p1+p2).

15. The irradiation unit according to claim 14, for a manufacturing device for additively manufacturing three-dimensional components by layer-by-layer application of a build-up material by means of at least one coating unit and locally selective solidification of the build-up material by at least one beam impinging on the build-up material and following a feed direction, wherein a control unit is provided and configured to control an irradiation path of the impinging beam such that the irradiation path of the impinging beam during the feed deviates from a feed center line M, wherein a deviation from M passes through at least two at least local maxima s1 and s2, wherein according to absolute value applies: s1≠s2.

16. A manufacturing device for additively manufacturing three-dimensional components, configured for carrying out the method according to claim 1 and/or comprising an irradiation unit and at least one coating unit.

* * * * *